United States Patent
Kameda et al.

(10) Patent No.: US 8,756,421 B2
(45) Date of Patent: Jun. 17, 2014

(54) AUTHENTICATION DEVICE USING TRUE RANDOM NUMBER GENERATING ELEMENT OR PSEUDO-RANDOM NUMBER GENERATING ELEMENT, AUTHENTICATION APPARATUS, AND AUTHENTICATION METHOD

(76) Inventors: Osamu Kameda, Tokyo (JP); Masakazu Sato, Tokyo (JP)

(*) Notice: Subject to any disclaimer, the term of this patent is extended or adjusted under 35 U.S.C. 154(b) by 1302 days.

(21) Appl. No.: 12/301,168

(22) PCT Filed: May 16, 2007

(86) PCT No.: PCT/JP2007/060471
§ 371 (c)(1),
(2), (4) Date: Jun. 29, 2009

(87) PCT Pub. No.: WO2007/132946
PCT Pub. Date: Nov. 22, 2007

(65) Prior Publication Data
US 2012/0210127 A1  Aug. 16, 2012

(30) Foreign Application Priority Data

May 16, 2006  (JP) .................. 2006-136484
Jul. 26, 2006  (JP) .................. 2006-202895

(51) Int. Cl.
*G06F 21/00* (2013.01)
*H04L 29/06* (2006.01)
*H04L 9/08* (2006.01)

(52) U.S. Cl.
CPC ............ *H04L 9/0822* (2013.01); *H04L 9/0819* (2013.01); *H04L 63/068* (2013.01)
USPC ........... 713/168; 713/169; 713/170; 713/171; 713/172; 713/173; 726/26; 726/27; 726/28; 726/29; 726/30

(58) Field of Classification Search
CPC .................... H04L 9/0819; H04L 9/0822
USPC ........................................... 713/168
See application file for complete search history.

(56) References Cited

U.S. PATENT DOCUMENTS

| 2002/0129250 A1 | 9/2002 | Kimura | |
| 2005/0204008 A1* | 9/2005 | Shinbrood | 709/206 |
| 2007/0079123 A1* | 4/2007 | Iwamura | 713/171 |

FOREIGN PATENT DOCUMENTS

| JP | 2926539 | 5/1999 |
| JP | 2000-101564 A | 4/2000 |
| JP | 2002-261755 A | 9/2002 |
| JP | 2002-3001851 A | 10/2002 |
| JP | 2005-174113 A | 6/2005 |
| JP | 2006-018545 A | 1/2006 |

OTHER PUBLICATIONS

International Search Report for PCT/JP2007/060471 completed Jul. 20, 2007.

* cited by examiner

*Primary Examiner* — Longbit Chai
(74) *Attorney, Agent, or Firm* — Studebaker & Brackett PC

(57) ABSTRACT

Provided are an authentication device using a true random number generating element or a pseudo-random number generating element, for example, a USB token, an authentication apparatus using the same, an authentication method, an authentication system and the like. In the authentication system, the authentication device is prepared on a user side, and one code generated in the authentication device is used to encrypt another code. The authentication apparatus registers the codes and decrypts the encrypted code sent from the authentication device by using the registered codes to perform an authentication.

17 Claims, 8 Drawing Sheets

AUTHENTICATION DEVICE USING TRUE RANDOM NUMBER GENERATING ELEMENT OR PSEUDO-RANDOM NUMBER GENERATING ELEMENT, AUTHENTICATION APPARATUS, AND AUTHENTICATION METHOD

TECHNICAL FIELD

The present invention relates to an authentication device using a true random number generating element or a pseudo-random number generating element, for example, a USB token, an authentication apparatus using the same, an authentication method, an authentication system, and the like.

BACKGROUND ART

A password generator called "one-time token" is known as means for generating a code (password) that varies each time an authentication is performed. In the authentication system using the one-time token, hardware and algorithms are previously shared by an authenticating side and an authenticated side in order to authenticate the code (password) which is generated in the token and which can be used only once.

For example, each of tokens distributed to users has a clock built therein and stores a numerical value unique to the token (hereinafter, such a numerical value will be referred to as "seed"). The token effects a specific calculation (algorithm) on the basis of time data obtained from the clock and the value of the seed, and generates a token code effective only for the token at a specific time. The generated token code is updated at time intervals predetermined for each token.

An authentication-side server (authentication manager) receives an ID (such as personal identification number) of a user and the token code that have been transmitted, verifies the ID and the token code, and judges whether or not an access source is a real or legitimate user.

DISCLOSURE OF THE INVENTION

However, the following problems are pointed out with regard to such an authentication system using a one-time token.

(1) The one-time token and an authentication management side must be synchronized in the time axis, which raises the fear that, if a fault occurs on the authentication management side, an authentication cannot be performed due to the time axis being shifted. Therefore, management needs to be ensured to prevent such an inconvenience, leading to a problem of an increase in management cost.

(2) The one-time token undergoes changes on the basis of the seed, but there is a limit to the number of seeds, thereby limiting the number of users.

(3) There is a possibility that the seed, which varies in accordance with the given algorithm, may be undesirably decoded.

The present invention has been made in order to resolve such a conventional defect.

An authentication device according to an embodiment of the present invention includes: a random number generating section for generating one of a true random number or a pseudo-random number; and a control section for reading at least two codes generated by the random number generating section and another code as necessary, and encrypting one code with another code.

Further, an authentication system according to an embodiment of the present invention includes: the authentication device; and an authentication apparatus for registering the at least two codes, and decrypting an encrypted code transmitted from the authentication device by using the registered codes to perform an authentication.

Further, a mail authentication system according to an embodiment of the present invention includes: a transmission-side terminal to which the authentication device can be detachably attached; a reception-side terminal to which the authentication device can be detachably attached; and a mail server for registering the at least two codes and decrypting an encrypted code transmitted from the authentication device by using the registered codes to perform an authentication.

Further, a distribution system for a content such as a video according to an embodiment of the present invention includes: a user-side terminal to which the authentication device can be detachably attached; and an authentication apparatus for registering the at least two codes in advance and decrypting an encrypted code transmitted from the authentication device by using the registered codes to perform an authentication.

Further, an authentication method according to an embodiment of the present invention includes: preparing the authentication device; registering the at least two codes; and decrypting an encrypted code transmitted from the authentication device by using the registered codes to perform an authentication.

Further, a mail authentication method according to an embodiment of the present invention includes: preparing the authentication device on each of a mail-transmitting side and a mail-receiving side; registering the at least two codes; and decrypting an encrypted code transmitted from the authentication device on the mail-transmitting side by using the registered codes to perform an authentication.

Further, a distribution method for a content such as a video according to an embodiment of the present invention includes: preparing the authentication device on a side of a user who receives distribution of the content such as the video; registering the at least two codes in advance; and decrypting an encrypted code transmitted from the authentication device by using the registered codes to perform an authentication.

BEST MODE FOR CARRYING OUT THE INVENTION

Hereinafter, description is made of some embodiments of the present invention by referring to the attached drawings.

First Embodiment

First, description is made of a system for performing an authentication by using two codes (the number of the used codes is not limited to two) that are generated in a true (or intrinsic) random number generator or a pseudo-random number generator (hereinafter, referred to as "RPG"). The system includes a USB token, a local side (PC), an authentication management side, etc. Herein, the USB token is used as a token (code generating device), and its shape may vary from a card type to a key fob type or the like, but there is no particular limitation on the shape. The same holds true in the other embodiments described later.

Figure 1:
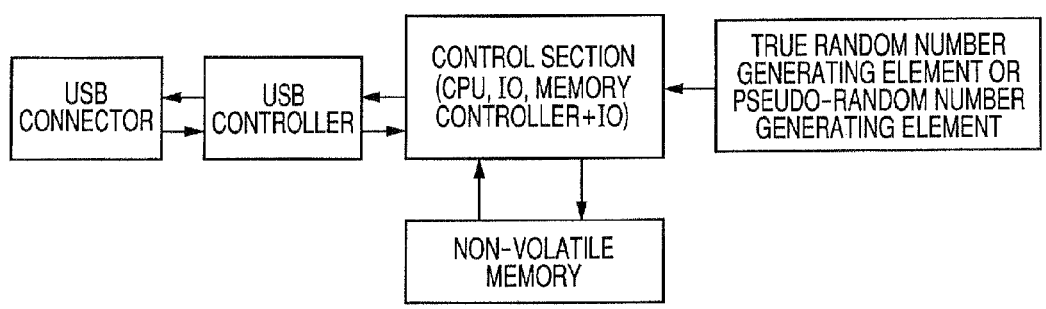
FIG. 1 is a block diagram of a USB token used for the present invention.

FIG. 1 is a block diagram of a token used in this embodiment. In this example, USB is used as an interface, but another interface may be used.

Two codes generated in a true random number generating element or a pseudo-random number generating element are read by a control section, and stored in a non-volatile memory. The control section includes a CPU, an I/O, a memory controller, etc. Used as the non-volatile memory is a flash memory, an EEPROM, an SRAM, or the like.

Though described in detail later, in addition to the above-mentioned functions, the control section has a function of encrypting a code, a function of transmitting a code to the PC on the local side via a USB controller and a USB connector, a function of performing a predetermined work according to an instruction from the PC, and other such functions. Note that, as the RPG, for example, one that is disclosed in JP 2,926,539 B is used.

An authentication procedure according to this embodiment is performed as follows.

1. Initial Setting

Initial two codes RPG1 and RPG2 that are generated in the USB token are set on the authentication side. A user name is registered at the same time.

The codes RPG1 and RPG2 are also recorded in the USB token.

The USB token is handed to a user.

In a case of a large number or an infinite number of users, the same work is performed with USB tokens for the number of users.

2. Authentication

Step 1: The code RPG2 is encrypted with the code RPG1 (common key) within the USB token.

Step 2: An encrypted code RPG2(EN) (authentication code) is transmitted to the authentication management side via the local side.

Step 3: On the authentication management side, the encrypted code RPG2(EN) is decrypted with the code RPG1 (code RPG2(DE)). Then, it is verified whether or not the decrypted code is identical to the code RPG2.

Step 4: If the code RPG2(DE) matches the code RPG2, the authentication management side permits the user's log-in to the local side, and if the code RPG2(DE) does not match the code RPG2, rejects the user's log-in to the local side.

3. New Code Setting

Step 1: After the log-in to the local side is completed in Step 4 of "2. Authentication", a new code RPG3 is generated (read from the RPG) within the USB token and recorded in the memory, while the code RPG1 is deleted. The codes RPG2 and RPG3 are recorded within the USB token.

Step 2: The code RPG3 is encrypted with the code RPG2 (new common key) within the USB token (an encrypted code RPG3(EN) is generated).

Step 3: The encrypted code RPG3(EN) is transmitted to the authentication management side.

Step 4: On the authentication management side, the encrypted code RPG3(EN) is decrypted with the code RPG2 (new common key).

Step 5: A decrypted code RPG3(DE) is registered as the code RPG3. On the authentication side, the codes RPG2 and RPG3 are registered (the code RPG1 is deleted).

After that, the works of 1 to 3 in the authentication procedure are repeated.

Therefore, according to this embodiment, on the USB token side and on the authentication management side, both the common key and the authentication code are updated upon each access, and the same updated common key and authentication code are held, and hence it is possible to realize the authentication system having a high secrecy.

Further, by using the true random number, it is possible to use a code that cannot be predicted by anyone (that cannot be controlled by anyone), which can realize the authentication system having a complete secrecy.

In addition, the authentication code is encrypted within the USB token, and hence the authentication can be performed by using any PC (local side), and any PC can safely perform server browsing.

Further, this embodiment provides safety with at least three-layered security due to the facts that two codes are used, the next code is newly registered at the moment when an authentication ends, a decryption key does not exist within a PC even if an authentication is requested through the PC because the two codes are held only within the USB token and encrypted within the USB token, and other such facts.

Figure 2:
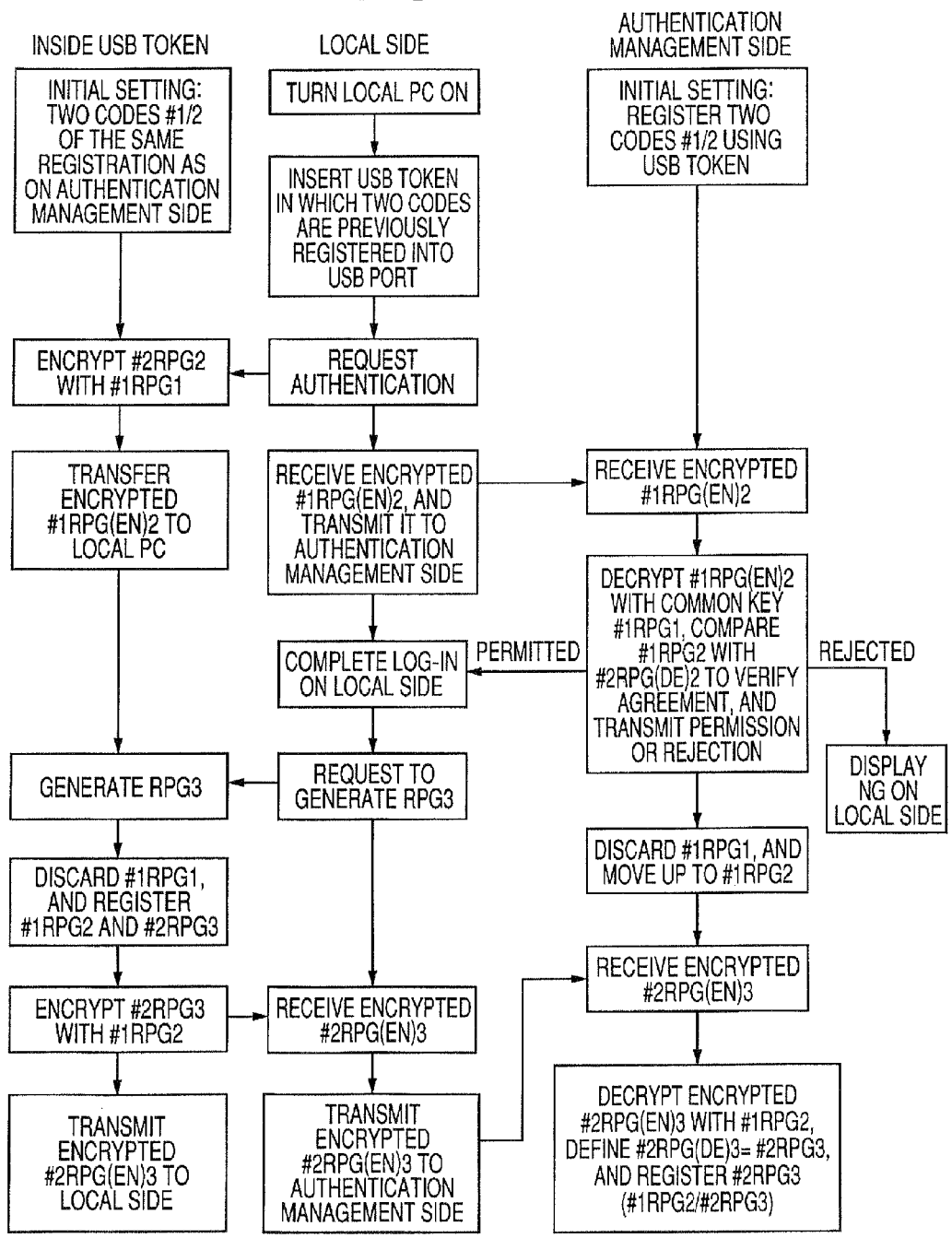
FIG. 2 is a flowchart illustrating an authentication procedure according to a first embodiment of the present invention.

FIG. 2 shows the above-mentioned authentication procedure according to this embodiment as a flowchart. Note that, in the flowchart shown in FIG. 2:

(1) a system code (for example, 64 bytes) and a client code (for example, 64 bytes) are not described;

(2) client codes are described as "#1" and "#2" for the convenience;

(3) "#1RPG1", "#1RPG2", and the like represent codes that are not encrypted;

(4) "#1RPG(EN)1", "#2RPG(EN)2", and the like represent encrypted codes; and (5) "#1RPG(DE)1", "#2RPG(DE)2", and the like represent decrypted codes.

Second Embodiment

Next, description is made of a mail server system that can ensure a complete secrecy by using the two codes generated in the true random number generator or the pseudo-random number generator (RPG) to perform an identification authentication and an encryption/decryption of a plain text. The system includes two clients of a sender and a recipient of mail (each owning authentication USB token) and a mail server (SMTP server used for reception and POP server used for transmission).

First, in order to configure the system, it is assumed that the following preconditions are set.

(1) With regard to (two, herein) the two clients (clients A and B), two codes RPGA1 (initial common key) and RPGA2 (initial ID) and two codes RPGB1 (initial common key) and RPGB2 (initial ID), respectively, are registered on a mail server side in advance. Obviously, mail addresses of the clients A and B are also registered thereon.

(2) Installed on the mail server are a plain text encryption/decryption algorithm FX and an encryption key generation algorithm FY. The same encryption algorithms are installed on sides of the clients A and B, respectively.

(3) Installed on the mail server is an authentication management function.

(4) Secured in the USB tokens of the clients A and B is a memory space having a memory capacity of, for example, approximately 1 gigabyte, enough to encrypt/decrypt a mail body and an attached file.

(5) As necessary, a dedicated mail application program (mailer) is newly developed.

The USB token used in this embodiment is the same as that shown in the block diagram of FIG. 1.

An operation of the system according to this embodiment as follows is described by being divided into operations performed by a transmission-side user (client A), the SMTP server, the POP server, and a reception-side user (client B).

1. Transmission-Side User (client A)

(1) The code RPGA2 is encrypted with the code RPGA1 (generation of authentication code RPGA2(EN)).

(2) An encryption key is generated from the code RPGA2 by the algorithm FY, and the encryption key is used to encrypt the mail body and the attached file (plain text) desired to be transmitted, by the algorithm FX.

(3) The encrypted code RPGA2(EN) and the encrypted mail body and attached file are transmitted to the SMTP server.

2. SMTP Server (1) The received code RPGA2(EN) is decrypted with the code RPGA1, and the identification (ID) authentication is performed (in the same manner as first embodiment).

(2) In the same manner as the transmission side, an encryption key is generated from the code RPGA2 by the algorithm FY, and the encryption key and the algorithm FX are used to decrypt the received mail body and attached file which are encrypted.

(3) It is confirmed that the client B is the recipient from a mail address of a transmission destination.

(4) An encryption key is generated from the ID code RPGB2 of the client B by the algorithm FY, and the encryption key and the algorithm FX are used to encrypt the decrypted mail body and attached file.

(5) The encrypted mail body and attached file are transferred to the POP server.

3. POP Server (1) After waiting for a mail request from the client B on the reception side (which occurs when client B inserts USB token thereof into terminal and launches mailer software), the encrypted mail body and attached file are transmitted to the terminal of the reception-side user (client B).

4. Reception-Side User (client B)

(1) The code RPGB2 and the algorithm FY are used to generate an encryption key.

(2) A mail request is made to the POP server, and the encrypted mail body and attached file are received.

(3) The encryption key and the algorithm FX are used to decrypt the encrypted mail body and attached file.

Note that the identification (ID) authentication between the reception-side user and the mail server can be performed in the same manner as the identification authentication between the transmission-side user and the mail server.

5. Code Update (1) On the transmission side, after the encrypted mail is transmitted to the mail server, a new code RPGA3 is generated (read from RPG) within the USB token and recorded in the memory, while the code RPGA1 is deleted. The codes RPGA2 and RPGA3 are recorded within the USB token.

(2) Subsequently, the code RPGA3 is encrypted with the code RPGA2 (a code RPGA3(EN) is generated), and is transmitted to the mail server.

(3) The mail server decrypts the code RPGA3(EN) with the code RPGA2. A decrypted code RPGA3(DE) is registered as the code RPGA3. On the mail server, the codes RPGA2 and RPGA3 are registered (the code RPGA1 is deleted).

(4) On the reception side, after decrypting the encrypted mail body and attached file, a new code RPGB3 is generated (read from RPG) within the USB token and recorded in the memory, while the code RPGB1 is deleted. The codes RPGB2 and RPGB3 are recorded within the USB token.

(5) Subsequently, the code RPGB3 is encrypted with the code RPGB2 (a code RPGB3(EN) is generated), and is transmitted to the mail server.

(6) The mail server decrypts the code RPGB3(EN) with the code RPGB2. A decrypted code RPGB3(DE) is registered as the code RPGB3. On the mail server, the codes RPGB2 and RPGB3 are registered (the code RPGB1 is deleted).

Therefore, in accordance with this embodiment, on the user side and on the mail server side, both the authentication key and the encryption key are updated upon each access, and hence it is possible to realize the mail system in which codes cannot be copied or tampered, which is safe, and which has a high secrecy. Further, by using the true random number, it is possible to use the code that cannot be predicted by anyone (that cannot be controlled by anyone), and the authentication and the encryption are simultaneously performed to thereby make so-called "spoofing" impossible. Further, each user cannot know an encryption key of another user, which completely prevents artificial leakage.

In addition, the authentication code is encrypted within the USB token, and hence the authentication can be performed by using any PC (user's terminal), and any PC can safely perform mail acquisition (mail within the used PC needs to be deleted). Further, the encryption is performed within the USB token, which provides safety even when the PC is connected to the Internet.

In addition, the RPG code is converted into each user's RPG code on the mail server side, which provides convenience without the need for including the common key of everyone on the terminal side.

Accordingly, this embodiment provides safety with at least three-layered security due to the facts that two codes are used, the next code is newly registered at the moment when an authentication ends, a decryption key does not exist within a PC even if an authentication is requested through the PC because the two codes are held only within the USB token and encrypted within the USB token, and other such facts.

Figure 3:
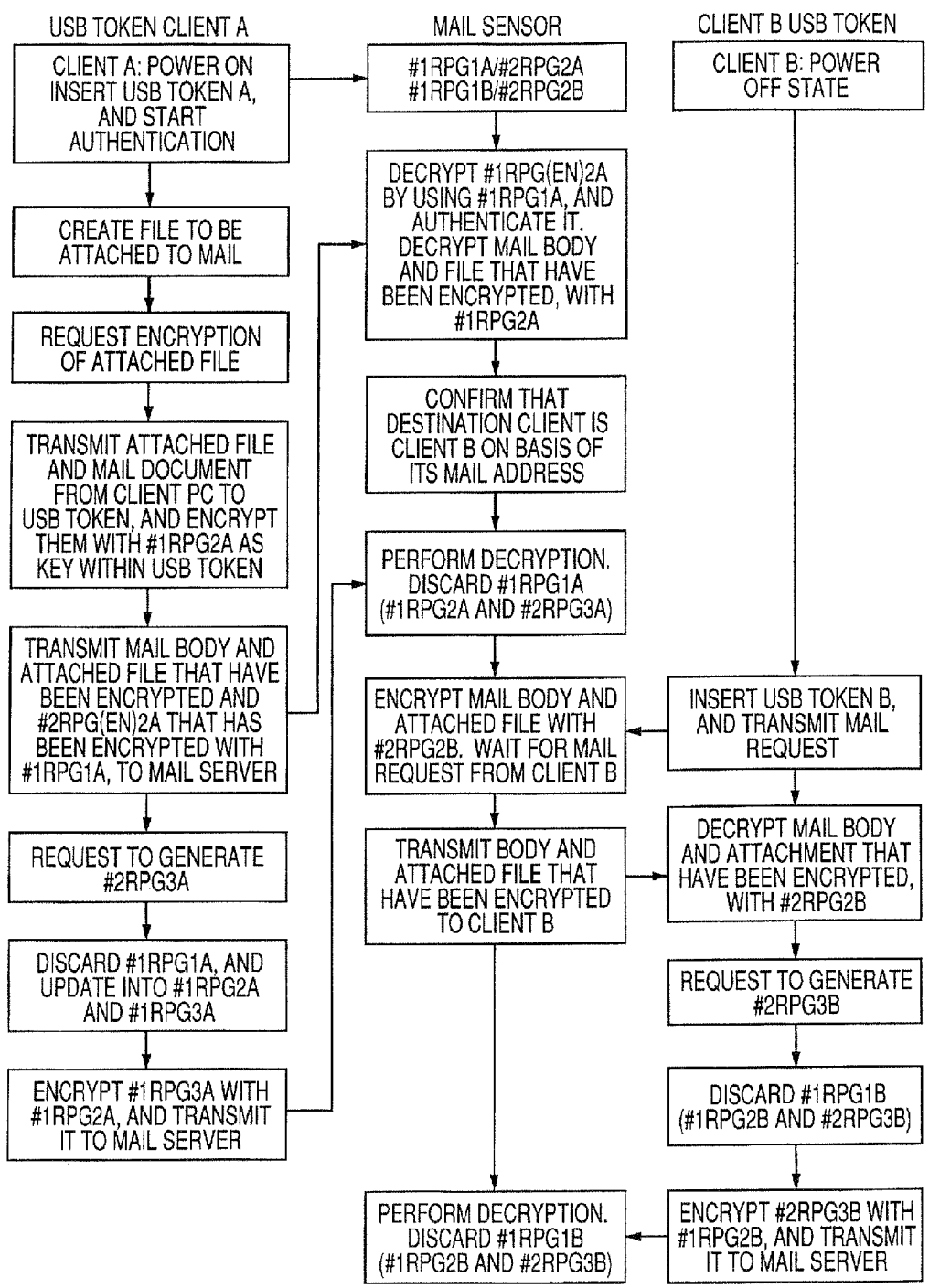
FIG. 3 is a flowchart illustrating an authentication procedure according to a second embodiment of the present invention.

FIG. 3 shows the above-mentioned authentication procedure according to this embodiment as a flowchart.

Third Embodiment

Next, description is made of an embodiment of a case of applying the authentication using the two codes generated in the true random number generator or the pseudo-random number generator (RPG) to a system for distributing a streaming video via a network such as a CATV or the Internet.

Figure 4:
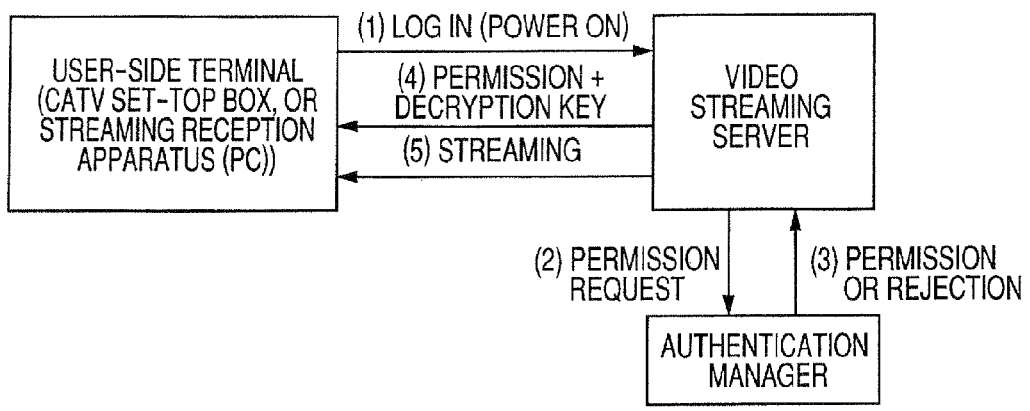
FIG. 4 is a block diagram illustrating an outline of a video distribution system according to a third embodiment of the present invention.

FIG. 4 is a block diagram illustrating an outline of a video distribution system to which authentication means according to the embodiment of the present invention is applied. The system shown in FIG. 4 includes a user-side terminal (set-top box of CATV or streaming reception apparatus (PC)), a video streaming server (hereinafter, referred to as "server"), and an authentication manager. An authentication management function of the authentication manager can be installed on the server. In a case of CATV, the server corresponds to a broadcast station of the cable TV.

An authentication process in the system is as follows.

(1) Logon is made to the server from the user side.

For example, the process is executed upon power on.

(2) The server requests the authentication manager for a permission to logon (authentication start).

(3) The authentication manager judges whether the permission to logon is granted or rejected as a result of the authentication.

(4) If it is judged that the permission is granted as a result of the authentication, the server permits the user side to logon, and at the same time, transmits a decryption key for decrypting encrypted data for video streaming.

(5) On the user side, the encrypted data is decrypted with the decryption key, and a video streaming service can be provided.

Figure 5:
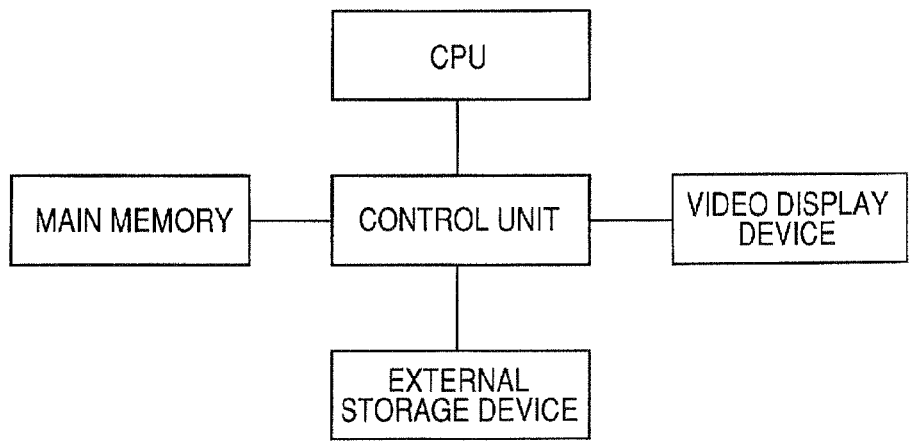
FIG. 5 is a block diagram illustrating an outline of an apparatus (PC) for receiving a streaming video according to the third embodiment of the present invention.

FIG. 5 is a block diagram illustrating an outline of a terminal (PC) for receiving a streaming video. The terminal includes a CPU, a main memory, an external storage device, a control unit, and a video display device. The control unit includes various interfaces such as USB and Ethernet (registered trademark), a streaming video processing circuit, an encryption/decryption circuit, various decoder circuits, etc.

Figure 6:
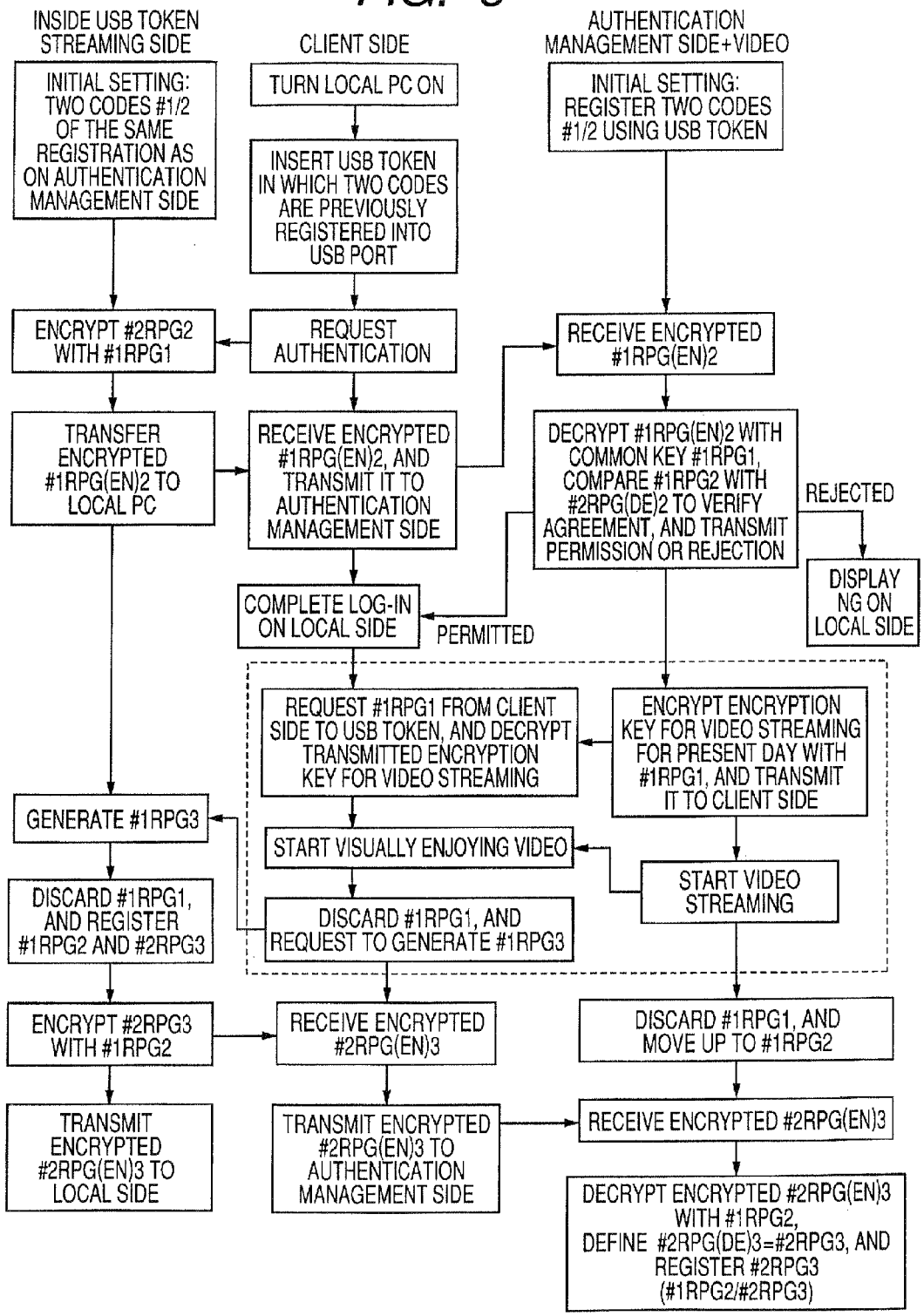
FIG. 6 is a flowchart illustrating an authentication procedure according to the third embodiment of the present invention.

FIG. 6 is a flowchart illustrating an authentication procedure for the video distribution system to which the authentication means according to the embodiment of the present invention is applied.

The flowchart of FIG. 6 is the same as the flowchart of FIG. 2 except a portion surrounded by a dashed line. However, "local side" of FIG. 2 corresponds to "client side" of FIG. 6, and "authentication management side" of FIG. 2 corresponds to "authentication management side+video streaming side" of FIG. 6 (hereinafter, abbreviated as "authentication management side" also in FIG. 6). Further, "local PC" of FIG. 6 represents a streaming reception apparatus (PC), and can be replaced by the set-top box of the CATV. Hereinafter, description is made only of the portion surrounded by the dashed line of FIG. 6. The procedure of the other portion is the same as in the first embodiment, and is therefore omitted.

After the identification authentication started by inserting the USB token of the user into the local PC is finished, the authentication management side encrypts the encryption key for video streaming with the code RPG1 and transmits the encrypted encryption key to the client side to start the video streaming.

Note that the encryption key (scrambling code) for video streaming can also be obtained from the true random number generator or a pseudo-random number generator (RPG) on the video streaming server (or broadcast station of CATV), and can be updated every day or at given time intervals. Further, a code used for encrypting the encryption key for video streaming may be the code RPG2 (since the user-side terminal has the codes RPG1 and RPG2, the encryption key, which has been encrypted by using any one of those codes, can be decrypted on the user side).

On the other hand, when log-in on the local side is completed, on the client side, the code RPG1 obtained by requesting the USB token for the code RPG1 is used to decrypt the encryption key for video streaming which has been transmitted from the authentication side. Accordingly, it is possible to start visually enjoying the video. Subsequently, the code RPG1 used for decrypting the encrypted data is discarded, and a request for generation of a new code RPG3 is made to the USB token.

In accordance with this embodiment, in the same manner as the authentication system according to the first embodiment, an identification code (ID) and the common key are updated upon each log-in, and the scrambling code on the server side is also updated every time or at given time intervals, which allows no one to perform prediction or control in the system, thereby providing a completely secure system.

In addition, the system according to this embodiment has the following characteristics.

(1) In a case where chargeable contents are audiovisually enjoyed in the video streaming using the CATV or the Internet, it is necessary to perform an authentication of the user, but if the user's terminal is changed, the user is required to apply again for an authentication by snail mail, for example. In this embodiment, once registration is performed, there is no need to apply again for an authentication, and any terminal (PC or set-top box) is made usable by insertion of the USB token, for example. The user only has to carry around the USB token.

(2) In the system, a different person is not even allowed to receive a video streaming service by spoofing with another person's account.

(3) In the system according to this embodiment, a safe authentication is performed every time, and the encryption key for video streaming can be changed once a day. Further, a code for decoding the encrypted data for video streaming is discarded from within the PC, the USB token and the authentication side immediately after the service is started with the encrypted data for video streaming having been decrypted, and a new code is registered, which provides safety.

(4) The code used for the authentication is encrypted within the USB token, and hence any PC can be used to perform the authentication, and any PC can receive a service with safety.

Accordingly, this embodiment provides safety with at least three-layered security due to the facts that two codes are used, the next code is newly registered at the moment when an authentication ends, a decryption key does not exist within a PC even if an authentication is requested through the PC because the two codes are held only within the USB token and encrypted within the USB token, and other such facts.

Fourth Embodiment

Description is made of a method of collectively managing keys inside a building, which uses an authentication mechanism according to the embodiment of the present invention.

1: It is assumed that all of keys regarding one building (which may be a plurality of buildings) are managed by a server.

2: The shape of the token may vary from a card type to a USB type.

3: The authentication means for a code according to the first embodiment is applied to a key to an actual door, an actual archive, or the like.

4: A door number or an archive number is set in advance, and is combined with the codes RPG1 and RPG2 generated as true random numbers to thereby specify a place, which can realize a key system that can prevent counterfeit at 100%.

5: If a spare key is necessary, instead of the combination with a code for specifying a place, a code for "spare key" is set to realize a key that can be used anywhere. By setting a secure policy in the spare key, the spare key can be managed as the key that can be used anywhere, a key only to the door of a room, or a key only to the archive.

6: By using this mechanism, it is possible to cooperate with entering and leaving management, server log-in management, or the like.

7: By combining with an RFID using a UHF band and providing antennas throughout the building, it is also possible to manage who is in which place. Further, if the token is attached to an object, it is possible to perform archive management of important documents or the like.

The system according to this embodiment can prevent counterfeit at 100%, and hence it is possible to realize a completely secure key system.

Fifth Embodiment

The authentication mechanism according to the embodiment of the present invention can be used for an authentication between interactive devices of digital home appliances. With regard to an access authentication from a home server, the PC outside a home, or the like, a code generated in the true random number generating element (RPG) is implemented within the digital home appliance to cause an internal CPU to perform a mutual authentication work, or a mutual authentication is performed by implementing a microcomputer including control software plus the true random number generating element (RPG) within the digital home appliance.

In most of the above-mentioned embodiments, the USB token is used in the shape of a token, the authentication mechanism can also be realized in the shape of a SIM card that is used for a GSM cellular phone, a FOMA cellular phone, or the like.

The authentication mechanism according to the embodiment of the present invention can also be realized in the shape of an IC card by a combination with a function of a non-contact IC card.

The authentication mechanism according to the embodiment of the present invention can also be realized in the shape of a ring or a wristwatch in a non-contact manner.

In the above-mentioned embodiments, two true random numbers are generated and used for the authentication, but more than two random numbers can be used to realize the authentication mechanism according to the embodiment of the present invention.

Further, the authentication mechanism according to the embodiment of the present invention can be realized by a combination of the true random number plus a PIN (number, name, or fingerprint).

Further, the authentication mechanism according to the embodiment of the present invention can be realized particularly by combining the true random number with a system code unique to each system for which a system code area of, for example, 128 bytes is set.

Further, according to the embodiment of the present invention, it is possible to set a secure policy for each user.

Sixth Embodiment

Next, description is made of a system in which three codes are used to perform an authentication. In the same manner as in the first embodiment, the system includes the USB token, the local side (PC), the authentication management side, etc. However, the PC can easily be applied by referring to the first embodiment, and hence for the simplicity of description, this embodiment is described on the assumption that a code is transferred between the USB token and the authentication management side.

First, the preconditions for this embodiment are described.

(a) Personal identification codes are set as "#1", "#2", ..., and "#n" (a serial number or the like is set as the identification code in, for example, a device authentication instead of a personal authentication).

(b) First codes generated as true random numbers or pseudo-random numbers are represented as "R1", "R2", and "R3".

(c) The description is made by taking an example of an exclusive OR as the algorithm for an encryption. It is naturally possible to employ another method.

Hereinafter, an authentication procedure according to this embodiment is described.

(1) Initial setting

Initial three codes R1 to R3 that are saved in the USB token from the random number generator as the identification code #1 are registered on the authentication management side.

(2) On the USB token side, the codes R1 and R2 are each encrypted (exclusive OR of each if the codes R1 and R2 is calculated) with the code R3 as a key (key code), and the encrypted code R1 and the encrypted code R2 are transferred to the authentication management side.

(3) On the authentication management side, those encrypted codes are each decrypted by using the key code R3 (exclusive OR of each of the encrypted codes and the code R3 is calculated), and the codes R1 and R2 are obtained. This confirms that the authentication management side has the same codes R1 to R3 as those on the USB token side.

(4) The authentication management side requests the USB token side to generate a new code R4.

(5) The USB token obtains the code R4 from the random number generator, encrypts the code R4 by using the codes R2 and R3, respectively, and transfers those encrypted codes R4 to the authentication management side.

(6) The authentication management side decrypts those encrypted codes R4 by using the codes R2 and R3, respectively, and when two values obtained by the decryption match each other, the value is registered as the code R4, and an authentication permission is issued to the USB token side.

(7) For the next authentication, the codes R2 to R4 are used to repeat the above-mentioned procedure.

Figure 7:
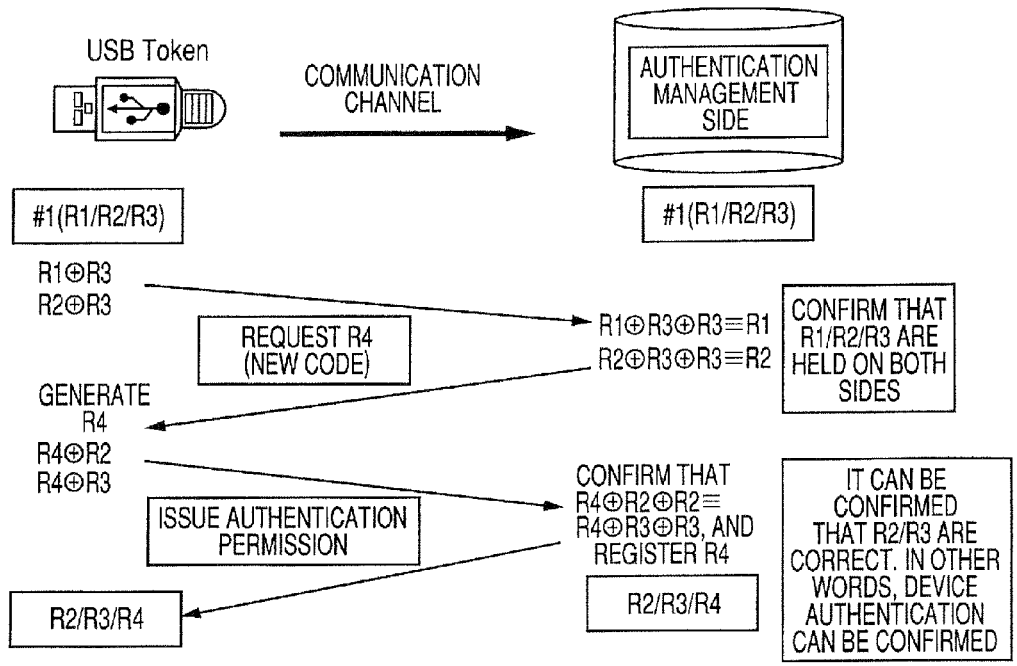
FIG. 7 is an explanatory diagram illustrating an authentication procedure according to a sixth embodiment of the present invention.

FIG. 7 is an explanatory diagram illustrating the above-mentioned procedure. Note that, in FIG. 7, the symbol with a plus sign surrounded by a circle indicates an operator of the exclusive OR.

The characteristics of the authentication of this embodiment are as follows.

The authentication is performed by confirming that a communication counterpart has the same three codes in the first code transfer and confirming that the communication counterpart has the correct codes R2 and R3 in the second code transfer, and at the same time, the new code R4 is registered. Hence, even if the above-mentioned two code transfers are tapped along a communication channel, spoofing is impossible, and since there is no functional relationship among the random numbers R1 to R4, the decryption is impossible.

Seventh Embodiment

Description is made of a mail server system to which device authentication means according to the sixth embodiment is applied. A basic configuration thereof is the same as that of the mail system according to the second embodiment.

First, the preconditions for this embodiment are described.

(a) Two clients having the identification codes #1 and #2 (users #1 and #2) exchange mail.

(b) The user #1 holds a USB token in which three codes (#1R1, #1R2, and #1R3) are saved as initial identification codes, while the user #2 holds a USB token in which three codes (#2R1, #2R2, and #2R3) are saved as initial identification codes.

(c) The initial three codes of the user #1 and those of the user #2 are also registered within the mail server.

(d) An application program (hereinafter, represented as function "F") for generating a key (key code) long enough to encrypt a plain text long enough is incorporated in the users #1 and #2 and the mail server, in each of which the same key is generated using the same seed.

Hereinafter, description is made of an operation of the system according to this embodiment, which is performed in a case where the user #1 transmits mail to the user #2.

(1) The same authentication as in the sixth embodiment is performed between the user #1 (having initial codes #1R1, #1R2, and #1R3) and the mail server (installed with authentication management function).

(2) After the mail server finishes the identification authentication of the user #1, on the user #1 side, by using an encryption key having the same length as that of the plain text generated by the function F(#1R3) with the code #1R3 as the seed, "mail text+attached file+identification code #2 (which may be mail address)" is encrypted (by using, for example, the exclusive OR), and is transmitted to the mail server.

(3) The mail server, which also has the code #1R3 of the user #1, generates the same key by the function F(#1R3) with the code #1R3 as the seed, and uses the key to temporarily decrypt the "mail text+attached file+identification code #2".

(4) The mail server confirms that the mail is addressed to the user #2 from the identification code #2 (mail address) obtained by the decryption of the above-mentioned item (3).

(5) A key having the same length as that of the plain text is generated by the function F(#2R3) with the code #2R3 as the seed, and the key is used to again encrypt the decrypted "mail text+attached file+identification code #2".

(6) The same identification authentication procedure as described above is performed when the user #2 is to acquire mail.

(7) After the identification authentication, the user #2 acquires the "mail text+attached file" encrypted with the code #2R3.

(8) The user #2 himself/herself decrypts the "mail text+attached file" by using the same key generated by the function F(#2R3) with the code #2R3 as the seed.

Figure 8A:
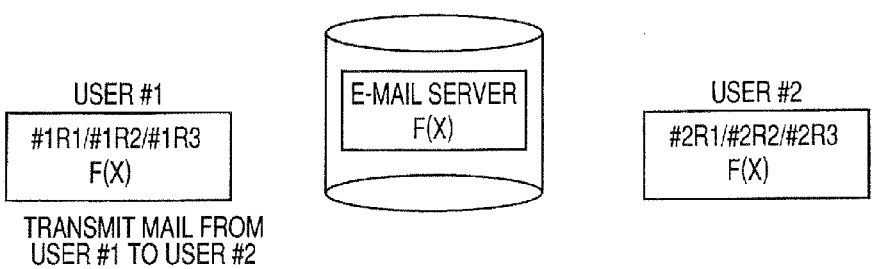
FIG. 8A is an explanatory diagram illustrating an authentication procedure according to a seventh embodiment of the present invention.
Figure 8B:
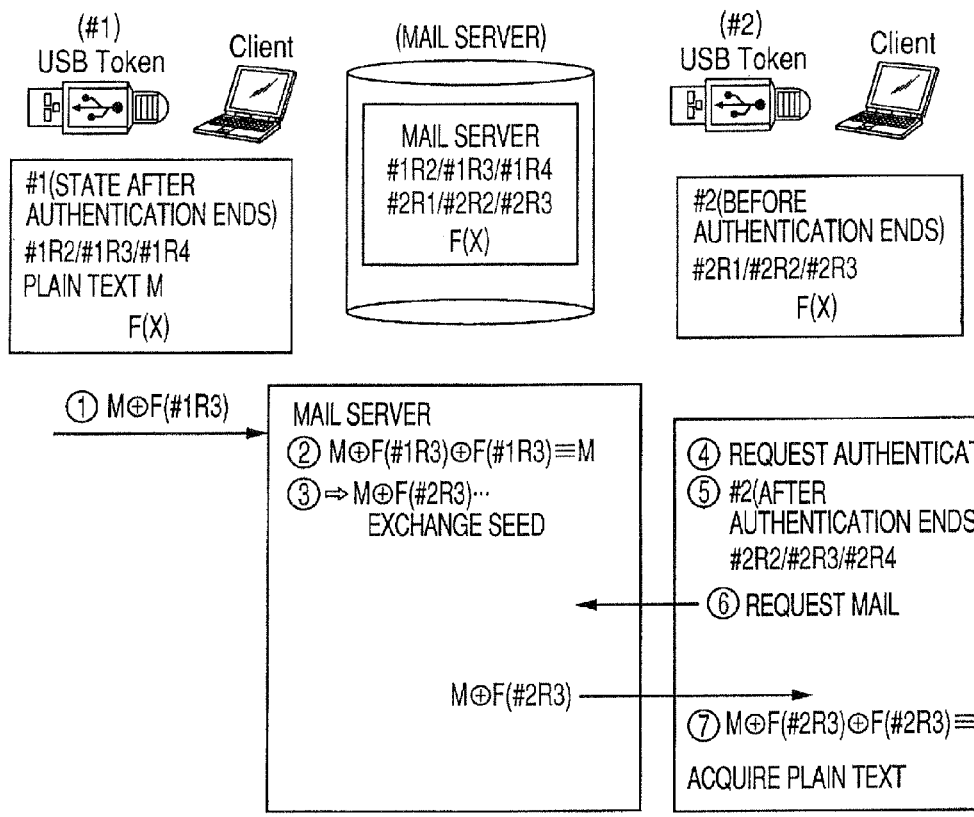
FIG. 8B is an explanatory diagram illustrating the authentication procedure according to the seventh embodiment of the present invention.

FIGS. 8A and 8B are explanatory diagrams illustrating the above-mentioned procedure. FIG. 8A shows the codes, the function F(X) (where X represents seed), and the like that are registered in each of the users #1 and #2 and the mail server at a time of the initial setting. FIG. 8B is a diagram for explaining the procedure after the authentication of the user #1 is finished, and for the user #1, a new code #1R4 obtained from the random number generator in response to a request from the authentication management side (mail server) upon the authentication of the user #1 himself/herself is registered (referred to sixth embodiment). The user #2 is in a state before the authentication of the user #2 himself/herself is finished.

In the system, a plain text is encrypted by the function F(#1R3) with the authentication code (#1R3) of each individual used for the authentication on the server side as the seed, and is transmitted to the server. On the server side, simultaneously with the authentication of the sender on the server side, with the authentication code (#1R3) used for the authentication of the sender as the seed, the function F(#1R3) is generated and the decryption is performed. After the decryption, an encryption is performed by using the key generated by the function F(#2R3) with the authentication code #2R3 of the user #2 as the seed. After the authentication is finished, the user #2 receives mail, and a key is generated by the function F(#2R3) with the authentication code (#2R3) used for the authentication as the seed, after which the mail is decrypted.

Accordingly, in the system, the seed of the function (application program) F(X) for generating a key used for an encryption/decryption is replaced (or interchanged) on the mail server.

The above-mentioned mail system according to this embodiment has the following characteristics.

(i) Three authentication codes are used to thereby allow an identification authentication to be performed with safety and reliability.

(ii) Only the server has the (three) respective authentication codes of the clients, and hence it is possible to replace (or interchange) the seed for the users #1 and #2 on the server. Accordingly, there is no decrypted seed even if the encrypted text is tapped along the communication channel, which makes it possible to build an extremely safe mail system.

Eighth Embodiment

Next, description is made of a video distribution system that uses the authentication system according to the sixth embodiment. A basic configuration thereof is the same as that of the system according to the third embodiment.

The preconditions for the system are as follows.

(a) Three codes for authentications of clients #1 to #n are held by a streaming server (serving as authentication server).

(b) A mechanism for instantaneously generating an encryption key long enough is held by the server side and the clients #1 to #n (function F(X)). The same encryption key long enough can be generated with the same seed.

(c) The contents such as a video are transmitted by being encrypted by the function F(SEEDx) with the code varying every day as the seed "SEEDx".

(d) After the authentication is finished, on the server, the seed SEEDx for generating a key varying every day, which is used for a decryption, is encrypted with the codes #1R3, #2R3, . . . , and is transmitted to each client.

(e) On the client side, the seed SEEDx is decrypted, and is used to generate the decryption key F(SEEDx).

(f) After the streaming is started, the transmitted contents are decrypted with the decryption key F(SEEDx), and are reproduced.

Figure 9:
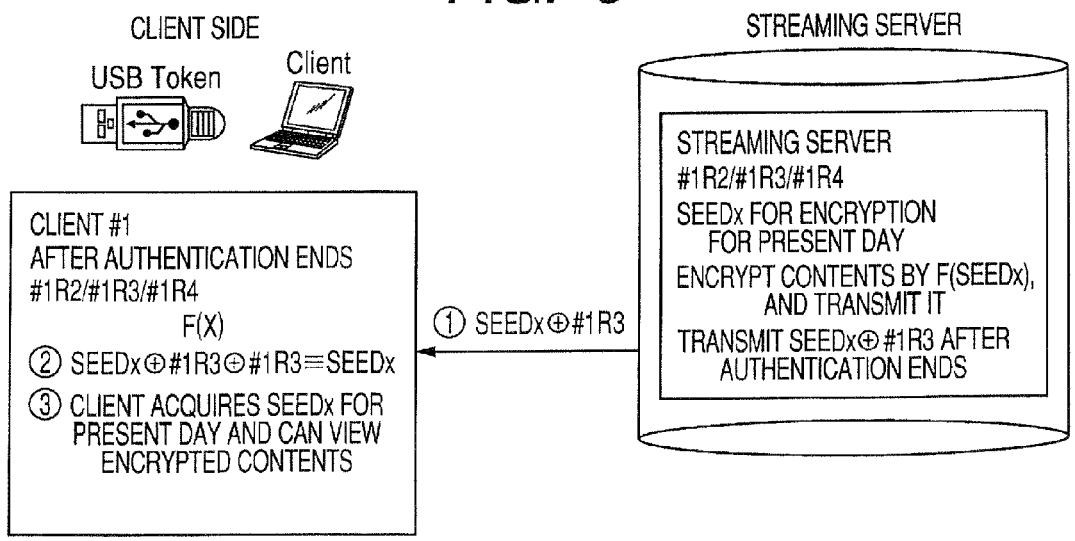
FIG. 9 is an explanatory diagram illustrating an authentication procedure according to an eighth embodiment of the present invention.

FIG. 9 is an explanatory diagram illustrating the above-mentioned procedure.

In the system, at all times, a code for an authentication which varies at a time of the authentication is held in common by the server side and the client side, and the function F(X) provided for an encryption of the contents is also held in common by the server side and the authentication side. Then, the seed of the content-encryption-purpose function F(X) for the present day is encrypted with the common code used for the authentication, and is transmitted to the client side, which makes it possible to build an extremely safe video distribution system.

Ninth Embodiment

Next, description is made of a system according to another embodiment, in which two codes are used to perform an authentication. In the same manner as in the first embodiment, the system includes the USB token, the local side (PC), the authentication management side, etc. However, the PC can easily be applied by referring to the first embodiment, and hence for the simplicity of description, this embodiment is described on the assumption that a code is transferred between the USB token and the authentication management side.

First, the preconditions for this embodiment are described.

(a) Personal identification codes are set as "#1", "#2", . . . , and "#n" (a serial number or the like is set as the identification code in, for example, a device authentication instead of a personal authentication).

(b) First codes generated as true random numbers or pseudo-random numbers are represented as "R1" and "R2".

(c) The description is made by taking an example of an exclusive OR as the algorithm for an encryption. It is naturally possible to employ another method.

Hereinafter, an authentication procedure according to this embodiment is described.

(1) Initial setting

Initial two codes R1 and R2 that are saved in the USB token from the random number generator as the identification code #1 are registered on the authentication management side.

(2) On the USB token side, the new code R3 is generated, the codes R1 and R2 are each encrypted with the code R3 as a key (key code) (exclusive OR between the codes R1 and R3 and exclusive OR between the codes R2 and R3 are calculated), and the encrypted code R1 and the encrypted code R2 are merged to be simultaneously transferred to the authentication management side.

(3) On the authentication management side, those encrypted codes are decrypted by using the codes R1 and R2, respectively (exclusive ORs are calculated). After confirming that the results are the same codes R3, on the authentication management side, the code R3 is registered, while an authentication permission is issued to the USB token side, and the code R3 is permitted to be updated.

(4) For the next authentication, the codes R2 and R3 are used to repeat the above-mentioned procedure.

Figure 10:
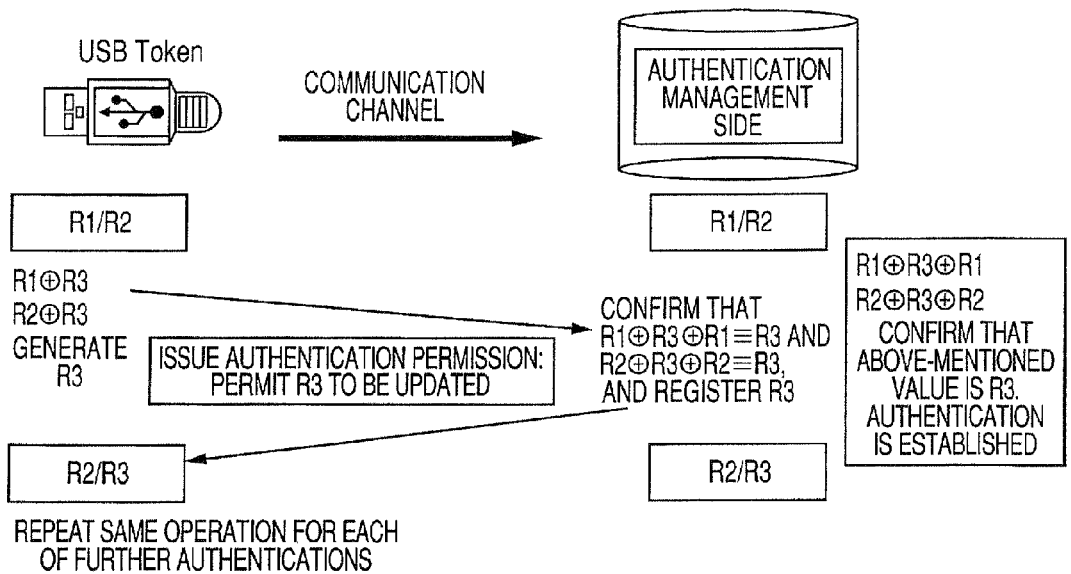
FIG. 10 is an explanatory diagram illustrating an authentication procedure according to a ninth embodiment of the present invention.

FIG. 10 is an explanatory diagram illustrating the above-mentioned procedure.

This embodiment provides a system in which three codes in total including two codes and one code generated newly upon the authentication are used to perform an authentication only once. In the system, even if a code transfer is tapped along the communication channel, neither decryption nor spoofing is possible because there is no functional relationship among the random numbers R1 to R3.

The authentication method according to this embodiment can naturally be applied to the mail system according to the seventh embodiment and the video distribution system according to the eighth embodiment.

Tenth Embodiment

Next, description is made of a system according to a further embodiment, in which three codes are used to perform an authentication. In the same manner as in the first embodiment, the system includes the USB token, the local side (PC), the authentication management side, etc. However, the PC can easily be applied by referring to the first embodiment, and hence for the simplicity of description, this embodiment is described on the assumption that a code is transferred between the USB token and the authentication management side.

First, the preconditions for this embodiment are described.

(a) Personal identification codes are set as "#1", "#2", . . . , and "#n" (a serial number or the like is set as the identification code in, for example, a device authentication instead of a personal authentication).

(b) First codes generated as true random numbers or pseudo-random numbers are represented as "R1", "R2", and "R3".

(c) The description is made by taking an example of an exclusive OR as the algorithm for an encryption. It is naturally possible to employ another method.

Hereinafter, an authentication procedure according to this embodiment is described.

(1) Initial setting

Initial three codes R1 to R3 that are saved in the USB token from the random number generator as the identification code #1 are registered on the authentication management side.

(2) On the USB token side, the codes R1 and R2 are each encrypted (exclusive OR of each of the codes R1 and R2 is calculated) with the code R3 as a key (key code), and the encrypted code R1 and the encrypted code R2 are transferred to the authentication management side in a merged state or separately.

(3) On the authentication management side, those encrypted codes are each decrypted by using the key code R3 (exclusive OR of each of the encrypted codes and the code R3 is calculated), and the codes R1 and R2 are obtained. This confirms that the authentication management side has the same codes R1 to R3 as those on the USB token side.

(4) The new code R4 generated on the USB token side is encrypted with the codes R2 and R3, respectively, as keys (key codes) (exclusive OR between the codes R4 and R2, and exclusive OR between the codes R4 and R3 are calculated), and the two encrypted codes R4 are transmitted to the authentication management side in a merged state or separately.

(5) On the authentication management side, those encrypted codes are decrypted (the exclusive ORs are calculated) by using the codes R2 and R3. After confirming that the results are the same codes R4, on the authentication management side, the code R4 is registered, while an authentication permission is issued to the USB token side, and the code R4 is permitted to be updated.

(6) For the next authentication, the codes R2 to R4 are used to repeat the above-mentioned procedure.

Note that the encrypted codes obtained in the above-mentioned items (2) and (4) may be merged to be transmitted together to the authentication management side. This can reduce the number of code transfers.

Figure 11:
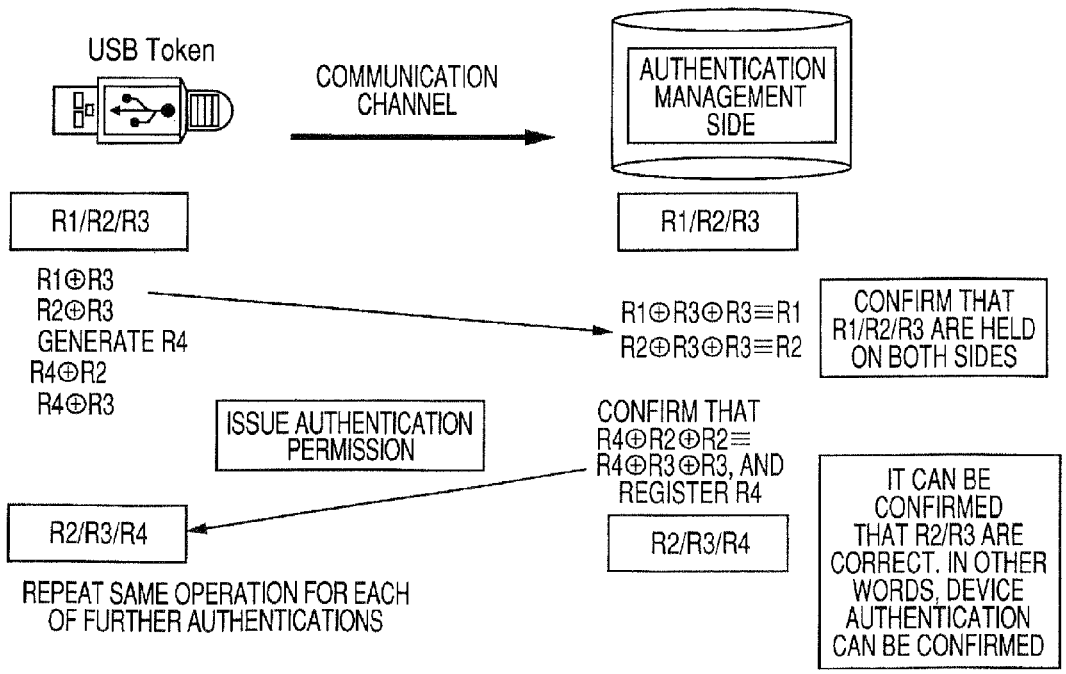
FIG. 11 is an explanatory diagram illustrating an authentication procedure according to a tenth embodiment of the present invention.

FIG. 11 is an explanatory diagram illustrating the above-mentioned procedure.

In this system, the device authentication is performed by using an indication that the codes R2 and R3 are correct if the codes R4 are the same, in the above-mentioned item (3), and the codes R2 and R3 have no mathematical relationship (because true random number or pseudo-random number is used), which ensures safety in terms of calculation. In other words, even if the code transfer is tapped along the communication channel, neither decryption nor spoofing is possible because there is no functional relationship among the random numbers R1 to R3.

The authentication method according to this embodiment can naturally be applied to the mail system according to the seventh embodiment and the video distribution system according to the eighth embodiment.

Eleventh Embodiment

As the authentication device used for the present invention, a card-type token provided with a USB interface can be used. Possible examples thereof include a credit card or a personal authentication card in a peripheral portion of which a connection terminal of the USB interface is buried. In this case, when the PC is used to perform an authentication, the PC and the card are connected to each other through an interface cable (customized extension cable or connector). The use of a conventional authentication card of a credit card type always necessitates a card reader, irrespective of a non-contact type or contact type, which has such a large shape as to be inconvenient to carry around and is expensive. In this embodiment, the extension cable or connector suffices, and the card is small in size and inexpensive, which leads to extremely high usability.

Further, the card provided with the USB interface can be used also in a case of, for example, purchasing merchandise in an e-commerce (electronic commerce), and does not have the card number input through the PC, which eliminates the fear of information leakage (therefore, the card provided with the USB interface can be applied to a bank card, a credit card, and the like).

This application claims priority from Japanese Patent Application No. 2006-136484 filed on May 16, 2006 and Japanese Patent Application No. 2006-202895 filed on Jul. 26, 2006, the disclosures of which are hereby incorporated by reference herein as a part of this application.

The invention claimed is:

1. An authentication system, comprising:
an authentication device having a random number generating section for generating one of a true random number or a pseudo-random number, and a control section for using at least one code generated by the random number generating section to encrypt another code generated by the random number generating section, said authentication device registering both of the generated codes to an authentication apparatus in an initial setting, and
the authentication apparatus for registering codes the same as said both of codes generated by the authentication device, in advance, in the initial setting, and for decrypting an encrypted code transmitted from an authentication device side by using the registered code and identifying thus decrypted code to perform the authentication,
wherein the authentication device generates a new code, which is different from a previously registered code, by the random number generating section during the authentication or after the end of the authentication, and encrypts the new code using the registered code, and the authentication apparatus uses the code as registered to decrypt the encrypted new code transmitted from the authentication device side during the authentication or after the end of the authentication, and registers thus decrypted new code, whereby said code(s) having been registered in the authentication device and the authentication apparatus respectively are updated, and
wherein a distributed content is encrypted, by using a key generated by using said updated new code, and is distributed to a user.

2. An authentication system according to claim 1, wherein the authentication device comprises a token of a USB type or a card type.

3. An authentication system according to claim 2, wherein the authentication device comprises the token of the card type provided with a USB interface.

4. An authentication system according to claim 1, further comprising a terminal, to which the authentication device can be detachably attached, for controlling the authentication device.

5. An authentication system according to claim 4, wherein the authentication device encrypts a new code generated by the random number generating section during the authentication or after the end of the authentication.

6. An authentication system according to claim 5, wherein the authentication apparatus uses the registered code to decrypt the encrypted new code transmitted from the authentication device side during the authentication or after the end of the authentication.

7. A mail authentication system comprising:
an authentication device having a random number generating section for generating one of a true random number or a pseudo-random number, and a control section for using at least one code generated by the random number generating section to encrypt another code generated by the random number generating section, said authentication device registering both of the generated codes to a mail server in an initial setting,
a mail-transmitting-side terminal to which the authentication device is detachably attached;
a mail-receiving-side terminal to which the authentication device is detachably attached; and
the mail server for registering codes the same as said both of codes generated by the authentication device on a mail transmitting side and a mail receiving side, in advance, in the initial setting, and for decrypting an encrypted code transmitted from the mail transmitting side and the mail receiving side by using the registered code and identifying thus decrypted code, and to perform the authentication,
wherein the mail transmitting side and/or the mail receiving side generates a new code, which is different from a previously registered code, by the random number generating section during the authentication or after the end of the authentication, and encrypts the new code using the registered code, and the mail server uses the code as registered to decrypt the encrypted new code transmitted from the mail transmitting side and/or the mail receiving side during the authentication or after the end of the authentication, and registers thus decrypted new code, whereby said code(s) having been registered in the mail transmitting side and/or the mail receiving side and the mail server respectively are updated, and
wherein the mail transmitting side uses the code generated by the authentication device to generate a key used for encrypting a mail body or a mail body and attached file during the authentication or after the end of the authentication, uses the key to encrypt the mail body or the mail body and attached file, and transmits the encrypted mail body or the encrypted mail body and attached file to the mail server; and
the mail server uses the registered code of the mail transmitting side to generate the key used for decrypting the mail body or the mail body and attached file, and uses the key to decrypt the encrypted mail body or the encrypted mail body and attached file transmitted from the mail transmitting side.

8. A mail authentication system according to claim 7, wherein the mail server confirms a recipient of mail on the basis of the decrypted mail body or the decrypted mail body and attached file, uses the registered code of the mail receiving side to generate the key used for encrypting the mail body or the mail body and attached file, uses the key to encrypt the mail body or the mail body and attached file, and transmits the encrypted mail body or the encrypted mail body and attached file to the mail receiving side in response to a request to transmit mail made from the mail receiving side.

9. A mail authentication system according to claim 8, wherein the mail transmitting side and/or the mail receiving side encrypts a new code generated by the random number generating section during the authentication or after the end of the authentication.

10. A mail authentication system according to claim 7, wherein the mail transmitting side and/or the mail receiving side encrypts a new code generated by the random number generating section during the authentication or after the end of the authentication.

11. A mail authentication system according to claim 10, wherein the mail server uses the registered code to decrypt the encrypted new code transmitted from the mail transmitting side and/or the mail receiving side during the authentication or after the end of the authentication.

12. A distribution system, comprising:
a userside terminal to which the authentication device having a random number generating section for generating one of a true random number or a pseudo-random number, and a control section for using at least one code generated by the random number generating section to encrypt another code generated by the random number generating section can be detachably attached, said authentication device registering both of the generated codes to an authentication apparatus in an initial setting; and the authentication apparatus for registering codes the same as said both of codes generated by the authentication device, in advance, in the initial setting, and for decrypting an encrypted code transmitted from a user side by using the registered code and identifying thus decrypted code, and performing to perform the authentication, wherein the user side generates a new code, which is different from a previously registered code, by the random number generating section during the authentication or after the end of the authentication, and encrypts the new code using the registered code, and the authentication apparatus uses the code as registered to decrypt the encrypted new code transmitted from the user side during the authentication or after the end of the authentication, and registers thus decrypted new code, whereby said code(s) having been registered in the user side and the authentication apparatus respectively are updated, and wherein a distributed content including at least a video is encrypted by using a key generated by using a code updated on a present day or every predetermined period, and is distributed to a user;

the authentication apparatus uses the registered code to encrypt the code updated on the present day or every predetermined period when distribution of the content such as the video is to be permitted after the authentication, and transmits the encrypted code to the user side; and the user side decrypts the encrypted code that has been transmitted, uses the decrypted code to generate the key, and uses the key to decrypt the distributed content including the video.

13. A distribution system according to claim 12, wherein the user side encrypts a new code generated by the random number generating section during the authentication or after the end of the authentication.

14. A distribution system according to claim 13, wherein the authentication apparatus decrypts the encrypted new code transmitted from the user side during the authentication or after the end of the authentication.

15. An authentication method, comprising:
preparing the authentication device having a random number generating section for generating one of a true random number or a pseudo-random number, and a control section for using at least one code generated by the random number generating section to encrypt another code generated by the random number generating section, said authentication device registering both of the generated codes to an authentication apparatus in an initial setting;

registering in the authentication apparatus codes the same as said both of codes generated by the authentication device, in advance, in the initial setting, and decrypting in the authentication apparatus an encrypted code transmitted from the authentication device side by using the registered code and identifying thus decrypted code, to perform the authentication, wherein the authentication device generates a new code, which is different from a previously registered code, by the random number generating section during the authentication or after the end of the authentication, and encrypts the new code using the registered code, and the authentication apparatus uses the code as registered to decrypt the encrypted new code transmitted from the authentication device side during the authentication or after the end of the authentication, and registers thus decrypted new code, whereby said code(s) having been registered in the authentication device and the authentication apparatus respectively are updated, and wherein a distributed content is encrypted, by using a key generated by using said updated new code, and is distributed to a user.

16. A mail authentication method, comprising:
preparing, on each of a mail-transmitting side and a mail-receiving side, the authentication device having a random number generating section for generating one of a true random number or a pseudo-random number, and a control section for using at least one code generated by the random number generating section to encrypt another code generated by the random number generating section, said authentication device registering both of the generated codes in an initial setting on each of a mail transmitting side and a mail receiving side;

registering in a mail server codes the same as said both of codes generated by the authentication device, in advance, in the initial setting, and decrypting in the mail server an encrypted code transmitted from the mail-transmitting side by using the registered code and identifying thus decrypted code to perform the authentication, wherein the mail transmitting side and/or the mail receiving side generates a new code, which is different from a previously registered code, by the random number generating section during the authentication or after the end of the authentication, and encrypts the new code using the registered code, and the mail server uses the code as registered to decrypt the encrypted new code transmitted from the mail transmitting side and/or the mail receiving side during the authentication or after the end of the authentication, and registers thus decrypted new code, whereby said code(s) having been registered in the mail transmitting side and/or the mail receiving side and the mail server respectively are updated, and wherein the mail-transmitting side uses the code generated by the authentication device to generate a key used for encrypting a mail body or a mail body and attached file during the authentication or after the end of the authentication, used the key to encrypt the mail body or the mail body and attached file, and transmits the encrypted mail body or the encrypted mail body and attached file to the mail-receiving side; and the mail-receiving side uses the registered code of the mail-transmitting side to generate the key used for decrypting the mail body or the mail body and attached file, and uses the key to decrypt the encrypted mail body or the encrypted mail body and attached file transmitted from the mail-transmitting side.

17. A distribution method, comprising:
preparing, on a side of a user who receives distribution of a content including at least a video, authentication device having a random number generating section for generating one of a true random number or a pseudo-random number, and a control section for using at least one code generated by the random number generating section to encrypt another code generated by the random number generating section, said authentication device registering both of the generated codes to an authentication apparatus in an initial setting:

registering in the authentication apparatus codes the same as said both of codes generated by the authentication device, in advance, in the initial setting; and decrypting in the authentication apparatus an encrypted code transmitted from the authentication device by using the registered code and identifying thus decrypted code to perform the authentication, wherein the user side generates a new code, which is different from a previously registered code, by the random number generating section during the authentication or after the end of the authentication, and encrypts the new code using the registered code, and the authentication apparatus uses the code as registered to decrypt the encrypted new code transmitted from the user side during the authentication or after the end of the authentication, and registers thus decrypted new code, whereby said code(s) having been registered in the user side and the authentication apparatus respectively are updated, and wherein a distributed content including at least the video is encrypted, by using a key generated by using said updated new code, and id distributed to a user.

* * * * *